United States Patent Office 3,753,980
Patented Aug. 21, 1973

3,753,980
PROCESS FOR THE PREPARATION OF
14-ANHYDROBUFALINE
Werner Haede, Hofheim, Taunus, Werner Fritsch, Neuenhain, Taunus, Kurt Radscheit, Kelkheim, Taunus, and Ulrich Stache, Hofheim, Taunus, Germany, assignors to Farbwerke Hoechst Aktiengesellschaft vormals Meister Lucius & Bruning, Frankfurt am Main, Germany
No Drawing. Filed Oct. 29, 1971, Ser. No. 194,003
Claims priority, application Germany, Oct. 30, 1970,
P 20 53 310.2
U.S. Cl. 260—239.57                    1 Claim

ABSTRACT OF THE DISCLOSURE

A process for the preparation of 14-anhydrobufaline by hydrogenating catalytically 3-keto-21-hydroxy-$\Delta^{4,14,20}$-cholatrienic acid-21-lactone treating 3-keto-21-hydroxy-5$\beta$-chola-14,20-dienic acid-21-lactone obtained with elementary sulfur in an inert high-boiling solvent and reducing the anhydrobufalone by means of trimethyl phosphite in isopropanol in the presence of iridium-IV-hydrochloric acid.

---

It is already known how to synthesize 14-anhydrobufaline-3$\beta$-hydroxy-14,20,22-bufatrienolide

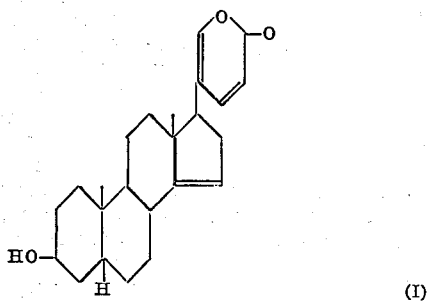

from 14$\alpha$-hydroxy-cortexolone in a series of more than 20 reaction steps (J. Amer. Chem. Soc. 91, 1228 (1969)). Anhydrobufaline has also been prepared from digitoxigenine (Chem. Commun. 2, 93 (1970)). In both cases the yields amount to about 1%, calculated on the respective starting material.

Now we have found a process for the preparation of anhydrobufaline (I) in high yields, wherein the 3-keto-21-hydroxy-$\Delta^{4,14,20}$-cholatrienic acid-21-lactone (II) is hydrogenated with palladium as a catalyst in the presence of an alkaline agent or slightly organic bases at low temperatures, the resulting 3-keto-21-hydroxy-5$\beta$-chola-14,20-dienic acid-21-lactone (III) is dehydrogenated in a high-boiling inert solvent by means of elementary sulfur and wherein the obtained 14-anhydrobufalone (IV) is reduced by means of trimethyl phosphite in isopropanol, in the presence of iridium-IV-hydrochloric acid as a catalyst, to form the 14-anhydrobufaline (VIa).

The process proceeds according to the following scheme:

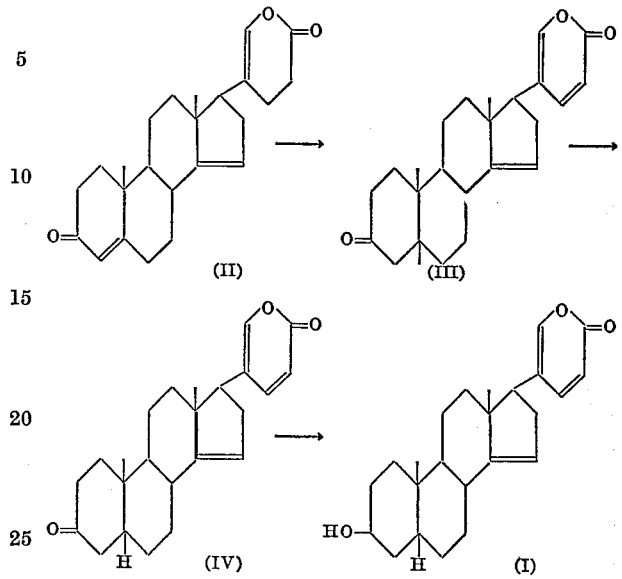

The starting material is prepared from 3-ethoxy-21,21-dimethoxy-20-oxo-$\Delta^{3,5,14}$-pregnatriene, as described in the examples. The catalytic hydrogenation of (II) may be brought about with palladium in the presence of an alkaline agent, for example sodium or potassium hydroxide; however, the operation is preferably effected with organic bases, preferably with palladium or calcium carbonate in the presence of pyridine. The hydrogenation is performed at low temperatures, between about 0° and 30° C., preferably at room temperature. Instead of pyridine, other organic bases such as tertiary aliphatic amines, for example triethyl amine, may be used.

The dehydrogenation for obtaining the lactone ring is preferably performed with elementary sulfur in a high-boiling solvent, preferably p-cymol or diphenyl ether, at temperatures between 170 and 210° C.

In the Compound IV thus obtained, the 3-keto group is reduced to the 3$\beta$-hydroxy group according to the known method of Henbest (Proc. Chem. Soc. 1964, 361). The operation is carried out with trimethyl phosphite in isopropanol in the presence of iridium-IV-hydrochloric acid as a catalyst.

The process according to the invention is advantageous and surprising. It was not forseeable, for example, that the catalytic hydrogenation of the double bond in 4-position of the Compound II may be carried out without hydrogenating simultaneously the other double bonds, especially the enol-lactone double bond and that even a very good yield of the desired 3$\beta$-H-Compound III would be obtained. Furthermore it is surprising that the reduction of the keto group according to Henbest, which proceeds under very acidic conditions, does not lead to a displacement of the 14,15 double bond to form the $\Delta^{8,14}$-compound more resistant to thermodynamical treatment, but that it results in the 14-anhydrobufaline with a nearly quantitative yield.

The process according to the invention renders possible a more simple and more economic preparation of 14-anhydrobufaline. The total yield starting from the easily obtainable 3-oxo-21-hydroxy-$\Delta^{4,14,20}$-cholatrienic acid-21-lactone amounts to 45%.

14-anhydrozufaline is an important intermediate for preparing resibufogenine and bufaline, which belong to the most cardioactive steroids which are found in nature. Bufaline is especially suitable for treating cardiac and cardiovascular diseases, but on account of its difficult preparation, it has hitherto found little favor in the field of therapeutics. The conversion of anhydrobufaline into bufaline is known from J. Am. Chem. Soc. 91,1228 (1969).

EXAMPLES (1) 3-oxo-21-hydroxy-5$\beta$-$\Delta^{14,20}$-choladienic acid-21-lactone (III)

250 mg. of a 10% Pd/CaCO$_3$ catalyst were shaken for 2 hours under hydrogen in 100 cc. of methylene chloride + 1 cc. of pyridine. Then 250 mg. of the catalyst and subsequently 2.5 g. of 3-oxo-21-hydroxy-$\Delta^{4,14,20}$-cholatrienic acid-21-lactone (II) were added. After a total absorption of 233 cc. of H$_2$ in 7.5 hours (main absorption within 3 hours), the solvents were distilled off in a rotation evaporator. The residue was suspended in a small amount of acetone and mixed with water. The deposit was filtered, dried and recrystallized from acetone. Yield: 2.2 g. (87%); melting point 204–205° C.

(2) 14-anhydrobufalone (IV)

500 mg. of 3-oxo-21-hydroxy-5$\beta$-$\Delta^{14,20}$-choladienic acid-21-lactone were refluxed with 2.5 g. of powdered sulfur in 10 cc. of p-cymol under nitrogen for 3 hours (bath temperature 190° C.). Subsequently the p-cymol was distilled off in vacuo and the residue was extracted by boiling with acetone. Most part of the sulfur remained undissolved, the filtered material was evaporated until dry, the residue was introduced into benzene and exposed to chromatography on 10 g. of silica gel. The material extracted with benzene and methylene chloride (1+1) contained at first the starting material (135 mg.), then the 14-anhydrobufalone eluted with methylene chloride, which was crystallized from a small amount of acetone. Yield: 200 mg. (=55%), melting point 234–237° C.

(3) 14-anhydrobufaline (I)

50 mg. of 14-anhydrobufaline were refluxed in 1 cc. of dioxan and 2 cc. of isopropanol which contained 15% of water, with 0.3 cc. of trimethyl phosphite and 5 mg. of iridium-IV-hydrochloric acid for 72 hourus under nitrogen (bath temperature about 100° C.). Then 5 cc. of water were added, and the reaction mixture was adjusted to pH 6 with 2 N sodium carbonate solution and concentrated in the rotation evaporator. The precipitated crude product was filtered off and washed with water. Yield: 47 mg. (=94%); melting point (of the partly amorphous crude product): 100 to 110° C., UV (methanol) $\lambda_{max.}$=300 m$\mu$, $\epsilon$=5500.

PREPARATION OF THE STARTING MATERIAL II (a) 3,21-dioxo-20-methylene-$\Delta^{4,14}$-pregnadiene 2 g. of sodium hydride were slowly introduced while stirring, under a nitrogen atmosphere, into 35 cc. of dimethylsulfoxide. The whole was slowly heated to 75° C. and maintained at this temperature for 45 minutes. At about 5° C., 26.5 g. of triphenyl-methyl-phosphonium bromide (dried at 120° C. and 0.01 torr on P$_4$O$_{10}$) and 70 cc. of dimethyl-sulfoxide were added in little portions. After leaving for 10 minutes at room temperature, the whole was mixed with 10 g. of 3-ethoxy-21.21-dimethoxy-20 - oxo - $\Delta^{3,5,14}$-pregnatriene (described in Tetrahedron Letters 1969, 3034), stirred for 26.5 hours at 70–75° C. and after cooling poured into 700 cc. of ice/water The deposit was filtered, dried and submitted to chromatography on 100 g. of Al$_2$O$_3$ (alkaline active stage II). The first parts of the eluent contained 3 - ethoxy - 21.21-dimethoxy-20-methylene-$\Delta^{3,5,14}$-pregnatriene (about 9 g.) as oil, which crystallized after addition of methanol. The crystals (about 7 g.) were suction-filtered, dissolved in 42 cc. of acetone and 21 cc. of methanol, mixed with 1.4 g. of p-toluene-sulfonic acid in 7 cc. of water and refluxed for 30 minutes. The 3.21 dioxo-20-methylene-$\Delta^{4,14}$-pregnadiene was precipitated from the hydrolysis solution and filtered off after cooling. Yield: 4.1 g. (50%); melting point 191–194° C. For the analysis the product was recrystallized from acetone; melting point 201–204° C.

(b) 3-oxo-21-hydroxy-$\Delta^{4,14,20}$-cholatriene acid 21-lactone (II)

3.45 g. of 3,21 - dioxo-20-methylene-$\Delta^{4,14}$-pregnadiene were stirred for 30 minutes at room temperature in 35 cc. of tetrahydrofuran and 35 cc. of methanol with 5.25 cc. of malonic acid dimethyl ester and a sodium methylate solution prepared from 35 mg. of Na+3.5 cc. of glacial methanol. Then the whole was neutralized with 0.1 cc. of acetic acid, mixed with 120 cc. of water and freed in vacuo (rotation evaporator) from the solvents. The additional product settled in a semi-solid form, so that the water could be poured off. The malonic acid dimethyl ester in excess was dispersed in vacuo at 70° C., and the residue was dissolved in ether. After purifying the ether solution with coal, 200 cc. of n-hexane were added. When compressing the filtrate (rotation evaporator), the mixture of isomers of the 23-carbomethoxy-3.21-dioxo-$\Delta^{4,14}$-choladienic acid-21-methyl ester was separated in an amorphous form: 4.0 g.; melting point 130° C. (from ether). The amorphous ester was refluxed in 40 cc. THF with 80 cc. of 0.6 N NaOH. After 5 minutes and further 30 minutes, 80 cc. of water were added each time. Boiling was continued for 1 hour, then the whole was acidified with diluted hydrochloric acid (pH about 3) and concentrated in vacuo (rotation evaporator), the 23-carboxy-3.21-dioxo-$\Delta^{4,14}$-choladienic acid being elminated. For decarboxylation the crude dicarboxylic acid dried in the exsiccator, was heated for 2.5 hours to 100° C. in 100 cc. of pyridine. The residue was dissolved in 30 cc. of methylene chloride, the solution was mixed with n-hexane and compressed (rotation evaporator). 2.8 g. of 3,21-dioxo-$\Delta^{4,14}$-choladienic acid were obtained; melting point 185–190° C. (after chromatography on silica gel and crystallization from ethyl acetate). In order to effect the ring closure, the obtained 2.8 g. of acid were refluxed for 20 hours in 250 cc. of toluene with 150 mg. of p-toluene sulfonic acid, the condenser in the steam room containing a Soxhlet apparatus with CaSO$_4$. The toluene solution was extracted by shaking with diluted Na$_2$CO$_3$ solution, dried with Na$_2$SO$_4$ and filtered through 2 g. of silica gel. The residue obtained in vacuo was crystallized from ether. Yield: 1.89 g. (49%) of II, the melting point being between 215 and 228° C. (from acetone). For the analysis, the product was recrystallized twice from acetone; melting point: 225–228° C.

What we claim is:

1. A process for the preparation of 3$\beta$-hydroxy-14,20, 22-bufatrienolide (14-anhydrobufaline), wherein the 3-keto-21-hydroxy-$\Delta^{4,14,20}$-cholatrienic acid-21-lactone is hydrogenated with palladium as a catalyst in the presence of an alkaline agent or slightly organic bases at lower temperatures; the obtained 3-keto-21-hydroxy-5$\beta$-chola-14,20-dienic acid-21-lactone is dehydrogenated with elementary sulfur in an inert high-boiling solvent and wherein the obtained 14-anhydrobufalone is reduced by means of trimethyl phosphite in isopropanol in the presence of iridium-IV-hydrochloric acid as a catalyst to form the 14-anhydrobufaline.

References Cited

UNITED STATES PATENTS 3,674,779 7/1972 Stacke et al. _____ 260—239.57
3,687,944 8/1972 Pettit et al. _____ 260—239.57

ELBERT L. ROBERTS, Primary Examiner